3,681,246
MEDIUM FOR CONSOLIDATING DUST IN COAL-MINES
Hans Lewer, Witten-Annen, Hanspeter Dust, Cologne, Deutz, and Martin Thonnes, Bergisch Gladbach, Germany, assignors to Chemische Fabrik Kalk G.m.b.H.
No Drawing. Filed Jan. 18, 1971, Ser. No. 107,505
Claims priority, application Germany, Jan. 20, 1970,
P 20 02 364.7
Int. Cl. C09k 3/22
U.S. Cl. 252—88          10 Claims

ABSTRACT OF THE DISCLOSURE

A medium for consolidating dust in coal-mines and preparation of said medium, comprising calcium chloride, magnesium chloride or mixtures thereof intimately mixed with sodium chloride.

BACKGROUND OF THE INVENTION

In the underground workings of coal-mines, an extremely important precautionary measure is that of combatting the dust which occurs and which can cause explosions and fires and expose the crews to the risk of silicosis.

A number of related proposals have been advanced for solving this problem. The coal-dust and refuse-dust, which is created and swirls about during the getting, conveying and firing operations and which is entrained by the moving air, impinges, during its travel in the air, on a moist tacky coating, applied to or formed on the periphery of the gallery, where it is retained in a moistened form, usually with the help of a wetting agent.

Since this tacky coating is only effective as long as it remains moist, it should preferably contain a hygroscopic salt solution which, because of its hygroscopicity, contains, or absorbs moisture from the atmosphere of the pit, so that it is in balance with the humidity of the surrounding atmosphere. The solution of hygroscopic salts, such as for example a calcium chloride or magnesium chloride solution, used for this purpose must be thickened to enable it to adhere to roof-heads and walls and to impart to it an adequate capacity for absorbing the dust to be consolidated. This is achieved, for example, by forming a paste by reaction between calcium hydroxide and magnesium chloride.

Other proposals consist in using the solid salt, for example, calcium chloride, instead of hygroscopic salt solution, and forming the solution by extracting moisture from the atmosphere of the pit. Adhesion of this solution to the surfaces of the workings is only ensured, however, if the resultant solution can be stored in an existing layer of dust that has already been deposited. In this connection, it can be of advantage in the case of small deposits of dust to mix into the finely-dispersed hygroscopic salt inert substances such as rock dust, clay, potash, and natural or synthetic calcium sulphate or calcium carbonate. In this way, a greater capacity for storing the hygroscopic salt solution on the pit workings is achieved, and the ability of the material to absorb the dust to be consolidated is increased.

Another dust-consolidating method, described in detail in "Glückauf" (1951), page 248 to 253, utilizes the dust-consolidating properties of a coating of rock salt. For this purpose, an adhesive coating of pulverized salt, to which is optionally added 5 percent by weight of $Ca(OH)_2$, is first applied to the walls and roof-heads. This coating carries the actual active layer of dust-retaining salt, comprised of coarse particles, to which is added 5 percent by weight of $Ca(OH)_2$. By moistening this double coating with a fine jet of water there is obtained, on the surface, a saturated rock-salt solution in the form of a thin film to which the deposited particles of dust firmly adhere. If the water used for moistening then evaporates, the rock-salt recrystalizes and the particles of dust become embedded between the crystals and are incapable of moving through the air. A prerequisite to the effectiveness of this method is a regularly repeated moistening of the surface coating of salt. The method is considerably limited by the need for a particular combination of factors, such as, quantity of air, air velocity and atmospheric humidity. In the case of relative humidities in excess of 76%, the method is ineffective since recrystallization of the rock-salt can no longer take place. At low relative humidities or at high air velocities, recrystallization takes place so rapidly that remoistening has to be carried out at excessively short intervals of time. Efforts to increase the effectiveness of the salt layer by the addition of hygroscopic salts were abandoned since such addition proved to be disadvantageous and ineffectual.

All of these methods have certain disadvantages. Because of the need to moisten the coating at regular and usually very short intervals of time, the rock-salt method involves considerable labour and can only be used at relative humidities of below 76%. In the paste method, large quantities of water, contained in the paste, have to be transported and handled. This method also involves considerable technical expense in the provision of special conveyor containers, pumps and piping. With the calcium chloride powder method, the quantity of powdered calcium chloride that has to be applied to the walls and roof-heads is dependent upon the dust substrate, i.e. less powdered calcium chloride can be applied to surfaces that are covered with little or no dust, than to surfaces heavily laden with dust. A further disadvantage of the finely-divided calcium chloride powder is its ability to move through the air, so that at high air velocities it can become troublesome to miners working in the stream of air and behind the blowing point.

Improvements to the method consists in creating artificial substrate of inert material when the deposit of dust is insufficient or in blowing the inert substance at the same time as, or as a mixture with, the hygroscopic powdered salt, and/or by adding water in fine jets to the dust-consolidating medium, so that agglomeration and recrystallization of the individual particles of salt powder are achieved to some extent, and their ability to move through the air is thus reduced.

Efforts have been made to discover a pulverulent medium for consolidating dust in coal-mine structures that can be blown, without the dust causing trouble to workers, and that adheres satisfactorily and possesses considerable ability to consolidate the dust.

SUMMARY OF INVENTION

A pulverulent medium, based on calcium chloride or magnesium chloride or mixtures thereof, wetting agents and water, has been discovered for consolidating dust in coal-mine constructions. At least 60 percent by weight of the medium should have a particle size in excess of 0.1 mm., and each particle should contain intimately mixed sodium chloride in addition to calcium chloride or magnesium chloride or mixtures thereof, non-ionic wetting agents and water in a range of about 0.5 to about 8.0 percent of the weight of the total quantity of the mixture.

The feature whereby at least 60 percent by weight of the medium according to the invention has a particle size in excess of 0.1 mm. reduces the ability of the medium to move through the air to such an extent that when the medium is applied to the surfaces of the gallery structure it is no longer detached from the structure by the air current. Despite this reduction in the ability of the medium, of this invention, to move through the air, said medium adheres very firmly to the surfaces of the gallery structure. A preferred medium of this invention is one in which about 30 to about 50 percent of the weight of the total mixture has particle sizes in the range of about 0.1 to about 0.2 mm.

DESCRIPTION OF THE PREFERRED EMBODIMENT

To achieve the above-mentioned advantages it is necessary for each particle of the medium of the invention to contain intimately mixed sodium chloride in addition to calcium chloride or magnesium chloride, non-ionic wetting agents and water in the range of about 0.5 to about 8.0 weight percent to the total weight of the medium. A mixture which contains calcium chloride or magnesium chloride and sodium chloride in a weight relationship of 1:0.2 to 5.0, is preferred.

In order to achieve the required intimate mixing of individual constituents in each particle of the medium in accordance with this invention, it is necessary to use solid components, the particle-size distributions of which are below the particle-size distribution that has proved advantageous for the medium of the invention.

In producing the medium of the present invention, a procedure is to agglomerate the finer particles present in the solid components to form larger particles. This is achieved, as an example, by mixing sodium chloride with water in a mixing apparatus to form a paste-like kneadable salt slurry which is then intimately mixed with finely divided calcium chloride or magnesium chloride. A wetting agent, dissolved in water or in powder form, is then applied to the resultant dry powder. The quantity of water necessary for producing the paste-like salt slurry should be between about 0.5 and about 8.0 percent of the weight of the total weight of the medium.

Other procedures for preparing the consolidating medium, of the present invention, utilize a corresponding quantity of an aqueous solution of the hygroscopic salts in place of the finely divided hygroscopic salts and part or all of the water of the above procedure.

Any kind of mixing apparatus having a slow to medium rate of revolution can be used in this mode of operation.

In another mode of operation, it is of an advantage to employ a mixing apparatus fitted with a cutting head. Sodium chloride, water and a wetting agent are mixed with the finely ground hygroscopic salt to form a dry powder. Sodium chloride, water and a wetting agent are first fed into the mixer, followed in a relatively short time by the finely ground hygroscopic salt or salt mixture. This results in a mixture in which any lumps that form are comminuted by the cutting head. It is also possible to use aqueous solutions of hygroscopic salts instead of, or in addition to, water and solid hygroscopic salt. Here again, the end product is a dry salt-mixture in powder form.

The hygroscopic salts used in the production of the medium, of the present invention, are calcium chloride, magnesium chloride or mixtures thereof in finely ground form and preferably having a particle-size distribution wherein the proportion of particles having a diameter of less than 1 mm. is more than 60 percent by weight, and preferably the proportion of particles having a diameter of less than 0.3 mm. is greater than 80 percent by weight. The weight ratio of hygroscopic salts, such as calcium chloride and magnesium chloride, to sodium chloride is preferably between 1:0.2 and 1:5. The ratio will depend upon the properties that the product is required to possess, e.g. ability to move through the air, and upon the conditions, such as the relative humidity of the atmosphere, in the place where the medium is to be used.

Any kind of sufficiently finely ground common salt or rock salt represents a suitable form of sodium chloride. A finely divided rock salt, comprising more than 50 percent by weight of particles of a size of less than 0.1 mm. and less than 10 percent by weight of particles of a size of more than 0.2 mm., has proved particularly advantageous.

Alkyl phenol polyglycol ethers have given good results as wetting agents. They are added in an amount of about 2 to about 5 percent of the total weight of the final mixture.

The mixing operations result in the agglomeration of the finer constituents of the powder salt and of the powdered hygroscopic salt, for example calcium chloride, to form somewhat larger particles, so that the particle-size distribution in the final mixture is considerably more favorable for the envisaged purpose than it is in the constituents of the mixture, as will be shown below by references to screen analyses. Thus, the finished mixture no longer contains particles that readily become airborne, and it can therefore be applied at any time, with the help of compressed air for example, everywhere on the gallery structure and the gallery floor, without troubling miners who may be working even at distances of less than 50 metres. Furthermore, the retentivity of the applied layer is considerably greater than that of unmixed hygroscopic powdered salts or mixtures thereof in inert substances. Thus, a thicker dust-consolidating coating can be applied in one operation than is possible when use is made of the above-mentioned unmixed hygroscopic salts, or such salts mixed with inert substances.

Consolidation of the dust is probably achieved with the medium, of the present invention, in two ways, (1) through the moisture which is absorbed from the atmosphere of the pit by the hygroscopic salts and is firmly retained in the dust-consolidating coating, and (2) through the sodium chloride which partly goes into solution and recrystallizes again.

The relative humidities of the atmosphere in the pit are considerably higher during the getting and conveying operations than during the standstill periods, due for example to the watering of the coal-faces and spraying of the conveyor means. Because of these fluctuations in relative humidity, part of the sodium chloride goes into solution and then recrystallizes in a continuous cycle. The sodium chloride dissolved in the hygroscopic salt solution passes through the coal-dust retained by the dust-consolidating coating and, when the relative humidity drops, crystallizes out on the surface of the coal-dust. The coal-dust is occluded and firmly retained by this recrystallized substance as in a latticed structure.

The followng examples are intended to illustrate more clearly how the dust-consolidating medium, of the present invention, is produced:

Example 1

600 kg. of finely-divided rock salt are put into a mixing apparatus and are sprayed with 25 kg. of water while the mixer is running. After a period of 5 minutes there is obtained a paste-like salt slurry which can be kneaded and which, during a further 10 minutes, is intimately mixed with 300 kg. of finely ground calcium chloride having 80 to 85 percent by weight of $CaCl_2$. A dry, free-flowing powder is formed from the paste-like mass. A mixture of 15 kg. of water and 30 kg. of a non-ionic wetting agent is then sprayed onto this powder. After mixing for 5 minutes, the finished dust-consolidating medium is obtained.

Example 2

600 kg. of finely divided rock salt, 40 kg. of water, 30 kg. of non-ionic wetting agent and 30 kg. of calcium chloride powder having 80 to 85 percent by weight of $CaCl_2$ are passed successively into a mixing apparatus fitted with a cutting head. A mass is obtained in which the lumps formed are comminuted by the cutting head of the mixing mechanism. The dust-consolidating medium, ready for use, is obtained after mixing time of 1 to 3 minutes.

PARTICLE-SIZE DISTRIBUTION OF THE SALTS USED

| Particle-size | Percent by weight | |
| --- | --- | --- |
| | CaCl₂ powder | Rock salt |
| Up to 0.1 mm | 65.5 | 56.2 |
| 0.1 to 0.2 mm | 18.5 | 35.7 |
| Above 0.2 mm | 16.0 | 8.1 |

PARTICLE-SIZE DISTRIBUTION OF THE MEDIUM, OF THE PRESENT INVENTION

| Particle-size | Example 1 | | Example 2 | |
| --- | --- | --- | --- | --- |
| | Proportion, percent by weight | Wetting agent content | Proportion, percent by weight | Wetting agent content |
| Up to 0.1 mm | 28.8 | | 33.0 | |
| 0.1 to 0.2 mm | 35.7 | 3.1% | 49.7 | 3.1% |
| Above 0.2 mm | 35.5 | | 17.3 | |

The foregoing discussion is intended as illustrative but not limiting. Still other variations within the spirit and scope of the present invention will readily present themselves to one skilled in the art.

What is claimed is:

1. A pulverulent medium for the consolidation of dust in coal mines comprising a medium having at least 60% by weight of a particle-size in excess of 0.1 mm. and wherein each of said particles comprises intimately mixed sodium chloride, a hydroscopic compound selected from the group consisting of calcium chloride, magnesium chloride and mixtures thereof, a wetting agent and water, said water being present in the range of about 0.5 to 8.0 by weight of the total mixture.

2. An intimately mixed pulverulent medium according to claim 1, wherein about 30 to about 50 weight percent of said medium has a particle size in the range of about 0.1 to about 0.2 mm.

3. An intimately mixed pulverulent medium according to claim 2, wherein the weight ratio of hygroscopic salt to sodium chloride is in the range 1:0.2 to 1:5.

4. An intimately mixed pulverulent medium according to claim 1, wherein the weight ratio of hygroscopic salt to sodium chloride is in the range of 1:0.2 to 1:5.

5. A method for the preparation of an intimately mixed pulverulent medium comprising (a) mixing water and sodium chloride to a paste-like, kneadable, salt slurry; (b) intimately mixing said salt slurry with a finely divided hygroscopic salt selected from the group consisting of calcium chloride, magnesium chloride and mixtures thereof to yield a powder; and (c) mixing a wetting agent with said powder.

6. A method for the preparation of an intimately mixed pulverulent medium according to claim 5, wherein about 30 to about 50 weight percent of said medium has a particle-size in the range of about 0.1 to about 0.2 mm.

7. A method for the preparation of an intimately mixed pulverulent medium according to claim 6, wherein the weight ratio of sodium chloride to hygroscopic salt is in the range of 1:0.2 to 1:5.

8. A method for the preparation of an intimately mixed pulverulent medium, according to claim 7, wherein the wetting agent is added as a powder.

9. A method for the preparation of an intimately mixed pulverulent medium, according to claim 7, wherein the wetting agent is added as an aqueous solution.

10. A method for the preparation of an intimately mixed pulverulent medium, according to claim 5, wherein more than 50 percent by weight of the sodium chloride has a particle-size less than 0.1 mm. and less than 10 percent by weight of the sodium chloride has a particle-size in excess of 0.2 mm.

References Cited
UNITED STATES PATENTS

| | | | |
| --- | --- | --- | --- |
| 3,334,468 | 8/1967 | Wilcox | 252—194 X |
| 1,824,588 | 9/1931 | Barstow | 252—88 X |
| 2,988,509 | 6/1961 | Schilberg | 252—194 X |
| 944,276 | 12/1909 | Punch | 252—88 |
| 1,045,982 | 12/1912 | Jeroch | 252—88 |
| 2,436,146 | 2/1948 | Kleinicke | 252—88 |

ROBERT F. BURNETT, Primary Examiner

M. E. McCAMISH, Assistant Examiner

U.S. Cl. X.R.

23—313; 98—50; 252—194